United States Patent [19]

Ersoy

[11] Patent Number: 5,626,212

[45] Date of Patent: May 6, 1997

[54] MOTOR VEHICLE WITH A GEARSHIFT LEVER AND A HAND BRAKE LEVER IN THE CENTER OF THE VEHICLE

[75] Inventor: Metin Ersoy, Walluf, Germany

[73] Assignee: Lemförder Metallwaren AG, Lemförde, Germany

[21] Appl. No.: 446,013

[22] Filed: May 19, 1995

[30] Foreign Application Priority Data

May 21, 1994 [DE] Germany ............... 44 17 987.1

[51] Int. Cl.⁶ ..................... B60K 41/26; B60K 20/04
[52] U.S. Cl. ........................... 192/4 A; 74/473 R
[58] Field of Search .................... 192/4 A; 74/18.1, 74/473 P, 491, 473 R; 180/336

[56] References Cited

U.S. PATENT DOCUMENTS

| 1,565,876 | 12/1925 | Wacker | 180/336 X |
|---|---|---|---|
| 1,720,007 | 7/1929 | Schuler | 192/4 A |
| 1,735,542 | 11/1929 | Monday | 192/4 A X |
| 1,788,894 | 1/1931 | Schjolin | 180/336 X |
| 1,898,492 | 2/1933 | Morse | 192/4 A |
| 2,018,469 | 10/1935 | Roehrl | 192/4 A X |
| 2,021,508 | 11/1935 | Harrison et al. | 192/4 A |
| 2,039,553 | 5/1936 | Roehrl | 192/4 A |
| 5,462,146 | 10/1995 | Doolittle et al. | 192/4 A |

FOREIGN PATENT DOCUMENTS

3214955C2  10/1983  Germany.

*Primary Examiner*—Rodney H. Bonck
*Attorney, Agent, or Firm*—McGlew and Tuttle

[57] ABSTRACT

The present invention pertains to a motor vehicle, in which a gearshift lever and a hand brake lever are arranged in the center of the vehicle, and the hand brake lever, designed as a short-arm lever, is mounted pivotably around a transverse axis, and cooperates with a progressively acting leverage-increasing mechanism. The gearshift lever and the hand brake lever are arranged next to each other in a common housing at right angles to the longitudinal axis of the vehicle.

5 Claims, 2 Drawing Sheets

MOTOR VEHICLE WITH A GEARSHIFT LEVER AND A HAND BRAKE LEVER IN THE CENTER OF THE VEHICLE

FIELD OF THE INVENTION

The present invention pertains to a motor vehicle, in which a gearshift lever and a hand brake lever are arranged in the center of the vehicle, the hand brake lever, which is designed as a short-arm lever, is mounted pivotably around a transverse axis, and the hand brake lever cooperates with a progressively acting leverage increasing mechanism.

BACKGROUND OF THE INVENTION

Such a vehicle has been known from DE 32 14 955-C2. To make it possible to mount both the gearshift lever and the hand brake lever, which is designed as a single double lever, from below, the two levers are arranged in the prior-art arrangement one behind the other in the longitudinal direction of the vehicle, the gearshift lever in front of the hand brake lever, on a common support, which is placed on a plate of the underbody before connection to the body. Since the hand brake lever must have a certain length to reduce the physical forces necessary for its operation, it can be accommodated only behind the gearshift lever, so that the length of the support of the two levers depends on the necessary distance between the two levers. The cutout of the body tunnel in the center of the vehicle must be reasonably large to make it possible to introduce and install both levers from below through this cutout during the connection of the underbody to the body. The hand brake lever blocks a considerable space for another meaningful use in the passenger compartment.

In addition, a short-arm brake lever with a leverage-increasing mechanism acting progressively as a function of the pivoting of the lever, which is installed in vehicle models of the firm of Mercedes-Benz AG, has been known from a document of the firm of STOPFIX-BREMSE, Schröter & Co. GmbH, Bunsenweg 11, 82538 Geretsried. This short-arm hand brake lever, which is also arranged in the longitudinal center of the vehicle behind the gearshift lever, acts during its pivoting by a leverage-increasing mechanism, e.g., a possibly spring-supported cam roller mechanism, with an increase in operating force. The assembly dimensions for the hand brake lever are reduced as a result, but the mounting is carried out in the manner generally practiced in the automobile industry, from the top, through the passenger compartment, after connecting the underbody to the body.

SUMMARY AND OBJECTS OF THE INVENTION

The primary object of the present invention is to free the space behind the gearshift lever in the passenger compartment for other uses, on the one hand, and to make possible a premounting of the hand brake lever on the underbody, on the other hand.

According to the invention, a motor vehicle is provided wherein a gear shift lever and a hand brake lever are arranged next to each other in a center of the vehicle. The hand brake lever is designed as a short-arm lever and is mounted pivotably around a transverse axis. The hand brake lever cooperates with a progressively acting leverage-increasing mechanism. The hand brake lever is arranged laterally next to the gear shift lever. The gear shift lever and the hand brake lever are premounted in a common module on a plate of the underbody of the motor vehicle, before the underbody is connected to the vehicle body.

As a result, it is possible to achieve the integration of the pivoting mounting of the hand brake lever and of the mounting of the gearshift lever in a common structural module, which has a small three-dimensional extension and can be premounted on the underbody of the vehicle, so that both the gearshift lever and the hand brake lever can be introduced into the passenger compartment from below during the connection of the underbody to the body. This is made possible, above all, by the use of a short-arm brake lever of a prior-art design in a common modular housing on the side next to the gearshift lever, wherein this housing with the two levers movably mounted in it is premounted on the underbody.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
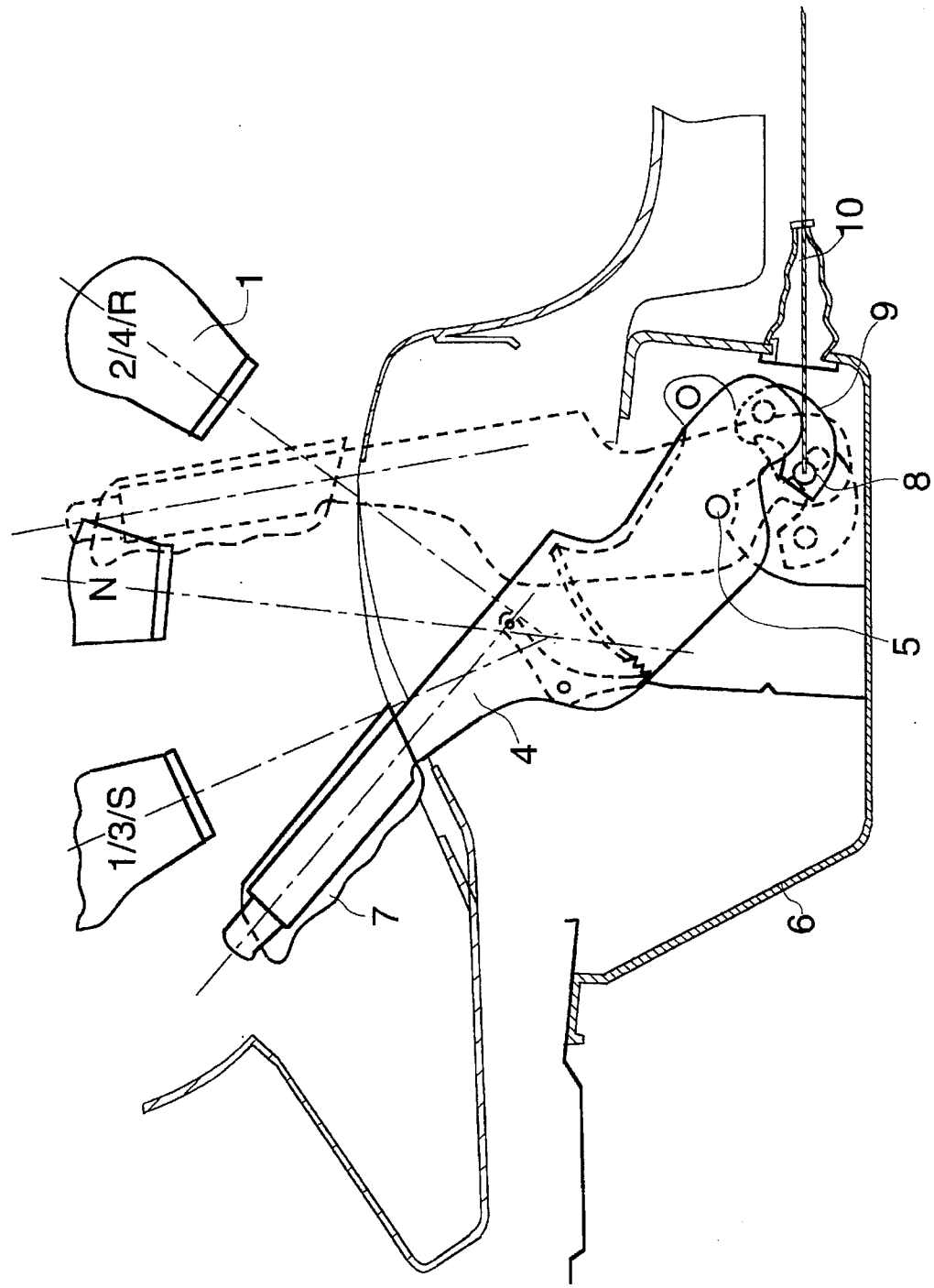
FIG. 1 is a longitudinal sectional view through the arrangement according to the present invention in parallel to the longitudinal center of the vehicle.
Figure 2:
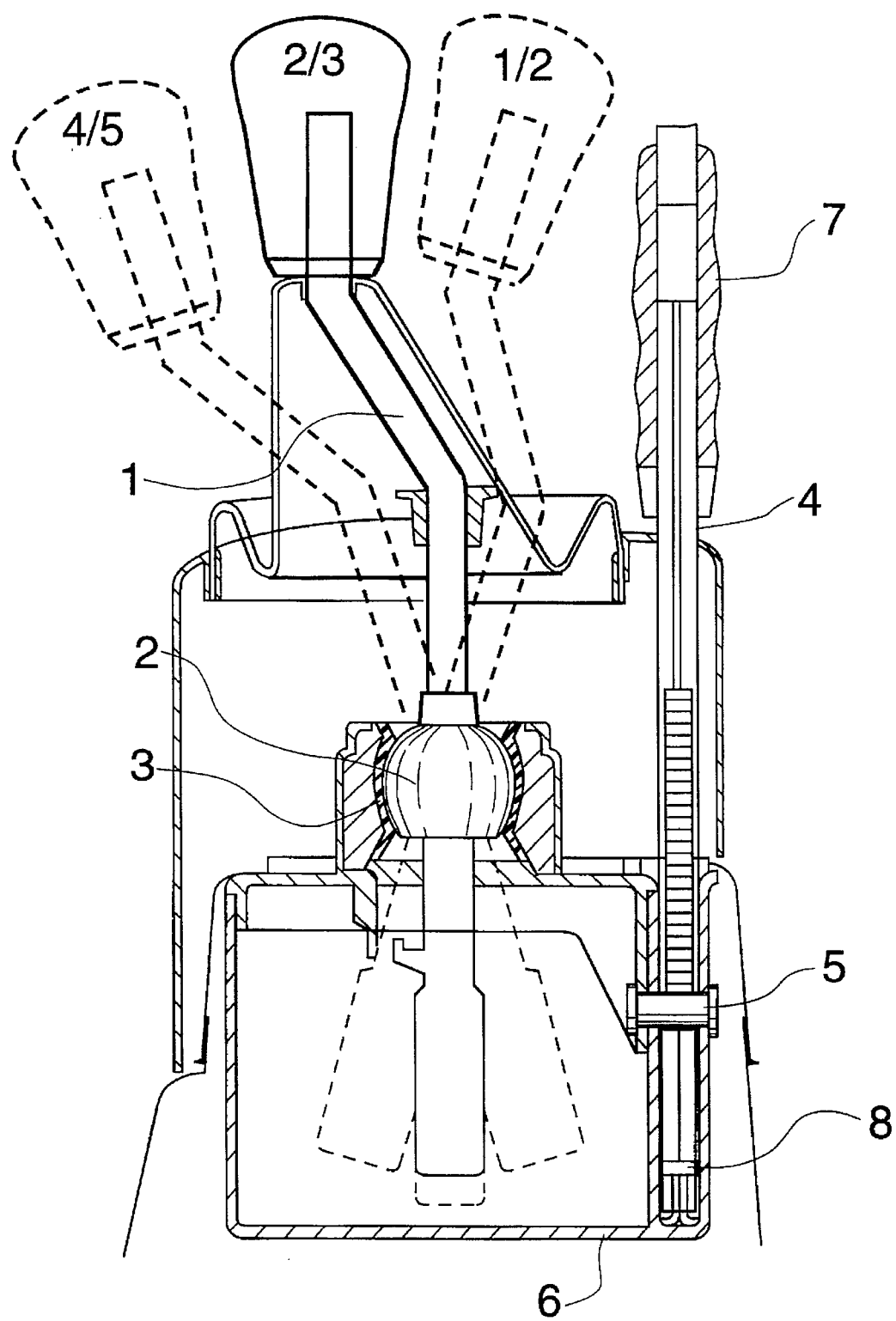
FIG. 2 is a cross section through the arrangement according to FIG. 1.

Referring to the drawings in particular, FIG. 1 shows the gearshift lever 1, schematically, based on the various possible positions (e.g. reverse, second and fourth gears toward the operator-driver and first and third and fifth gears toward the front of the vehicle and a more central neutral position). A hand brake lever 4 is also shown. FIG. 2 shows the gearshift lever 1 in three different lateral positions (viewed from the front of the vehicle). That is, FIG. 1 depicts the position for the first and reverse gears, second and third gears, fourth and fifth gears. As seen in FIG. 2, the brake lever 4 is arranged in the center of the vehicle with the gearshift lever 1. The hand brake lever 4 is designed as a short-arm lever. The gearshift lever 1 and the hand brake lever 4 are arranged next to each other (see in particular FIG. 2.)

In the design embodiment of the features of, the present invention, the gearshift lever 1 with a ball-and-socket joint 2 in a joint shell 3, on the one hand, and the hand brake lever 4 pivoting around a pivot axis 5 located at right angles to the longitudinal center of the vehicle are arranged next to each other in a common housing 6. The housing 6 with the gearshift lever 1 mounted movably in it and with the pivotably mounted hand brake lever 4 is connected to the underbody of the motor vehicle, which is not shown in detail in the drawing. The gearshift lever 1 and the hand brake lever 4 are thus located next to each other at right angles to the longitudinal center of the vehicle. The hand brake lever 4 may also be arranged in front of the gear shift lever relative to a longitudinal direction of the vehicle. The hand brake lever 4 is designed as a short-arm lever in the known manner. The end of the hand brake lever 4, designed as a double lever, which end is opposite the grip end 7, cooperates with a leverage-increasing mechanism, in which a cam lever 9 pivotable around an axis 8 has cams, which are complementary to cams on the hand brake lever 4, so that the adjusting forces exerted on the hand brake lever are progressively increased as a function of the pivoting movement of the hand brake lever 4, in order to exert sufficiently strong pulling forces on the cable 10 leading to the wheels of the vehicle with the smallest possible pivot angle and with weak physical forces to be applied to the grip end 7. The force-increasing mechanism may also have a different design and may also be supported by spring force (by use of a spring) if desired.

While a specific embodiment of the invention has been shown and described in detail to illustrate the application of the principles of the invention, it will be understood that the invention may be embodied otherwise without departing from such principles.

What is claimed is:

1. A gearshift lever and hand brake lever for a motor vehicle wherein the gearshift lever and hand brake lever are arranged next to each other, comprising: a short-arm hand brake lever, mounted pivotably around a transverse axis; a progressively acting leverage-increasing mechanism connected to said short-arm hand brake lever; a gearshift lever, said short-arm hand brake lever being arranged laterally next to said gearshift lever; a common module including said short-arm hand brake lever arranged laterally next to said gearshift lever, premounted on a plate of an underbody whereby said underbody is subsequently connected to a body of the motor vehicle and wherein said common module includes a common housing with said short-arm hand brake lever and said gearshift lever mounted therein, said common housing being premounted with said short-arm hand brake lever and said gearshift lever on said underbody, whereby said body is subsequently connected to said underbody.

2. A gearshift lever and hand brake lever for a motor vehicle wherein the gearshift lever and hand brake lever are arranged next to each other, comprising: a short-arm hand brake lever, mounted pivotably around a transverse axis; a progressively acting leverage-increasing mechanism connected to said short-arm hand brake lever; a gearshift lever, said short-arm hand brake lever being arranged next to said gearshift lever; a common module including said short-arm hand brake lever arranged next to said gearshift lever, premounted on a plate of an underbody whereby said underbody is subsequently connected to a body of the motor vehicle and wherein said common module includes a common housing with said short-arm hand brake lever and said gearshift lever mounted therein, said common housing being premounted with said short-arm hand brake lever and said gearshift lever on said underbody, whereby said body is subsequently connected to said underbody.

3. Motor vehicle according to claim 2, wherein said hand brake lever is arranged laterally adjacent to said gearshift lever.

4. A gearshift lever and hand brake lever for a motor vehicle, comprising:

a short-arm hand brake lever, mounted pivotably around a transverse axis;

a progressively acting leverage-increasing mechanism connected to said short-arm hand brake lever;

a gearshift lever, said short-arm hand brake lever being arranged adjacent to said gearshift lever;

a common module including a common housing with said short-arm hand brake lever and said gearshift lever mounted therein with said short-arm hand brake lever arranged adjacent to said gearshift lever, said common module being premounted on a plate of an underbody whereby said underbody is subsequently connected to a body of the motor vehicle.

5. Motor vehicle according to claim 4, wherein said hand brake lever is arranged laterally adjacent to said gearshift lever.

* * * * *